(12) United States Patent
Hatanaka et al.

(10) Patent No.: US 10,933,438 B2
(45) Date of Patent: Mar. 2, 2021

(54) COATING APPARATUS WITH BASE MATERIAL HEIGHT CHANGING DEVICE CONFIGURED TO SELECTIVELY EJECT COMPRESSED GAS

(71) Applicant: Panasonic Intellectual Property Management Co., Ltd., Osaka (JP)

(72) Inventors: Motoi Hatanaka, Osaka (JP); Michirou Yoshino, Osaka (JP); Hiroshi Tanabe, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/255,667

(22) Filed: Jan. 23, 2019

(65) Prior Publication Data

US 2019/0232328 A1 Aug. 1, 2019

(30) Foreign Application Priority Data

Feb. 1, 2018 (JP) .............................. JP2018-016048

(51) Int. Cl.
| | | |
|---|---|---|
| *B05C 5/02* | (2006.01) | |
| *B05C 9/08* | (2006.01) | |
| *B65H 23/24* | (2006.01) | |
| *H01M 4/04* | (2006.01) | |
| *B05D 3/02* | (2006.01) | |

(Continued)

(52) U.S. Cl.
CPC .............. *B05C 5/0254* (2013.01); *B05C 9/08* (2013.01); *B05C 13/00* (2013.01); *B05D 1/26* (2013.01); *B05D 3/0272* (2013.01); *B65H 23/24* (2013.01); *H01M 4/0404* (2013.01); *H01M 4/0409* (2013.01); *H01M 4/0411* (2013.01); *H01M 4/139* (2013.01); *B05D 2252/02* (2013.01); *B65H 2301/5114* (2013.01); *B65H 2406/112* (2013.01); *F26B 13/104* (2013.01); *H01M 10/052* (2013.01)

(58) Field of Classification Search
CPC ........ B05C 5/0254; B05C 5/0258; B05C 9/10
See application file for complete search history.

(56) References Cited

U.S. PATENT DOCUMENTS

| 4,527,510 A | * | 7/1985 | Arndt .................. B05C 11/1023 |
| | | | 118/324 |
| 4,912,948 A | * | 4/1990 | Brown .................. B05C 5/0254 |
| | | | 118/410 |

(Continued)

FOREIGN PATENT DOCUMENTS

| JP | 2-214567 | 8/1990 |
| JP | 6-099123 | 4/1994 |

(Continued)

*Primary Examiner* — Binu Thomas
(74) *Attorney, Agent, or Firm* — Wenderoth, Lind & Ponack, L.L.P.

(57) ABSTRACT

A coating apparatus includes a transport roll for transporting a base material, a slit die facing a lower surface of the base material, a coating liquid supply controller for switching on and/or off in supply of a coating liquid to the slit die, and a base material height changing device for ejecting compressed gas onto the lower surface of the base material during a specific period from a termination of the supply of the coating liquid to the slit die to a restart of the supply of the coating liquid to the slit die.

8 Claims, 13 Drawing Sheets

(51) Int. Cl.
*B05D 1/26* (2006.01)
*H01M 4/139* (2010.01)
*B05C 13/00* (2006.01)
H01M 10/052 (2010.01)
F26B 13/20 (2006.01)

(56) References Cited

U.S. PATENT DOCUMENTS

| | | | |
|---|---|---|---|
| 5,114,753 A | | 5/1992 | Shibata et al. |
| 5,299,364 A | * | 4/1994 | Heikkila ................ B65H 23/24 |
| | | | 34/460 |
| 5,674,556 A | * | 10/1997 | Fukumura ............. B05C 5/0254 |
| | | | 427/113 |
| 6,436,465 B1 | | 8/2002 | Tsunoda et al. |
| 2012/0103252 A1 | | 5/2012 | Watanabe |
| 2012/0263873 A1 | * | 10/2012 | Weitkamp ............ B05C 5/0245 |
| | | | 427/207.1 |
| 2014/0120258 A1 | * | 5/2014 | Anderson ........... B05C 11/1042 |
| | | | 427/256 |

FOREIGN PATENT DOCUMENTS

| | | | |
|---|---|---|---|
| JP | 4354598 B | | 10/2009 |
| JP | 2013107053 A | * | 6/2013 |
| WO | 2011/001648 | | 1/2011 |
| WO | 2012/167224 | | 12/2012 |

* cited by examiner

COATING APPARATUS

FIG. 10

| | | EXAMPLE 1 | EXAMPLE 2 | EXAMPLE 3 | EXAMPLE 4 |
|---|---|---|---|---|---|
| CONDITION | METHOD | COMPRESSED AIR | COMPRESSED AIR | COMPRESSED AIR | COMPRESSED AIR |
| | PRESSURE | 0.4 MPa | 0.2 MPa | 0.4 MPa | 0.4 MPa |
| | T3 | 0 SECOND | 0 SECOND | 0 SECOND | 0 SECOND |
| | T4 | 1 SECOND | 1 SECOND | 0.1 SECOND | 1 SECOND |
| | EJECTION POSITION | ENTIRE WIDTH 60 mm | ENTIRE WIDTH 60 mm | ENTIRE WIDTH 60 mm | CENTER 30 mm |
| RESULT | DISPLACEMENT OF BASE MATERIAL | | | | |
| | H2 | 0.9 mm | 0.5 mm | 0.9 mm | 0.9 mm |
| | H3 | 0.6 mm | 0.4 mm | 0.6 mm | 0.6 mm |
| | LINEARITY L | 0.5 mm | 1.0 mm | 1.0 mm | 0.3 mm |
| | DETERMINATION | ○ | ○ | ○ | ○ |

| | | EXAMPLE 5 | EXAMPLE 6 | EXAMPLE 7 | EXAMPLE 8 |
|---|---|---|---|---|---|
| CONDITION | METHOD | COMPRESSED AIR | COMPRESSED AIR | COMPRESSED AIR | SERVOMOTOR |
| | PRESSURE | 0.4 MPa | 0.4 MPa | 0.4 MPa | — |
| | T3 | 0 SECOND | 0.1 SECOND | 0.1 SECOND | — |
| | T4 | 1 SECOND | 1 SECOND | 1.1 SECOND | — |
| | EJECTION POSITION | ENTIRE WIDTH 60 mm RISING 0.5 sec | ENTIRE WIDTH 60 mm | ENTIRE WIDTH 60 mm | — |
| RESULT | DISPLACEMENT OF BASE MATERIAL | | | | |
| | H2 | 0.9 mm | 0.9 mm | 0.9 mm | 1.0 mm |
| | H3 | 0.6 mm | 0.6 mm | 0.6 mm | 0.8 mm |
| | LINEARITY L | 0.1 mm | 0.1 mm | 0.1 mm | 1.5 mm |
| | DETERMINATION | ○ | ○ | ○ | ○ |

COATING APPARATUS WITH BASE MATERIAL HEIGHT CHANGING DEVICE CONFIGURED TO SELECTIVELY EJECT COMPRESSED GAS

CROSS-REFERENCE TO RELATED APPLICATION

This application claims the benefit of Japanese Patent Application No. 2018-016048, filed Feb. 1, 2018, which is incorporated by reference herein in its entirety.

TECHNICAL FIELD

The technical field relates to a coating method used for manufacturing a battery electrode plate of a lithium ion secondary battery and the like.

BACKGROUND

A battery electrode plate is manufactured by forming a coating film having a uniform thickness by discharging a coating liquid including an active material, a binder, a thickener, and a solvent from a tip end of a die to a base material transported in a roll-to-roll manner, and by drying the formed coating film.

The battery electrode plate is roughly classified into a positive electrode plate and a negative electrode plate. A battery is configured by sandwiching a separator between electrodes, winding or stacking the separator and electrodes, and enclosing the separator and the electrodes in a can together with an electrolyte. In particular, in recent years, while a battery for a vehicle is popularized, inventors have aimed at high capacity and safety of the battery, and it has become important how to manufacture an electrode plate having a uniform thickness and a high-density coating film.

In order to realize the high capacity of the battery, it is necessary to increase the amount of the active material while reducing the usage amount of the base material. Therefore, it is necessary to form coating films on opposite sides of the base material. In addition, the inventors aim at how to increase productivity while prices become lower, and various technologies have been developed.

In recent years, a method is proposed in which a coating film is formed on one surface of the base material transported by the roll-to-roll manner while the base material is supported by a backup roll, the base material is inverted after the base material having the coating film is dried in a drying oven, a coating film is formed on the other surface of the base material while the base material is supported by the backup roll, and the base material having the coating film is dried in the drying oven.

Although the coating film can be stably manufactured by this method, since the two drying processes are required, and the surface is necessarily inverted when the coating film is formed on the other surface of the base material, there are problems in that facility costs increase, a process becomes longer, and a space is required. Thus, the productivity is limited.

As a method for solving the above-described problems, a method, in which slit die discharge ports face each other on opposite surfaces of a base material, coating films are formed on the opposite surfaces of the base material while a coating liquid is simultaneously discharged from slit dies, and the opposite surfaces of the base material are simultaneously dried, is proposed in Japanese Patent No. 4354598.

A method in which a coating film is formed by a slit die while a base material is supported against one surface (an upper surface) of the base material by a backup roll, the base material is transported in a horizontal direction, a slit die having a discharge port is installed vertically above the other surface (a lower surface) of the base material, and a coating film is formed on the lower surface of the base material so that electrode plates are collectively formed on opposite surfaces of the base material, is proposed in International Patent No. WO2011/001648.

SUMMARY

However, in a method disclosed in Japanese Patent No. 4354598, when slit dies have different discharge pressures, there is a problem in that the position of the base material is easily affected by the different discharge pressures, and the coating thicknesses of the coating liquids on one side and the other side of the base material are different from each other.

Further, in a method disclosed in International Patent No. WO2011/001648, although the method is suitable for continuously forming a coating film, when the coating film is intermittently formed on a base material in a longitudinal direction, in a section of a lower surface uncoated portion which is formed between a lower surface coated portion and a lower surface coated portion and to which the surface of the base material is exposed, since the base material is easy to be drawn to a side of the slit die by a surface tension when a coating liquid is pulled into the slit die, a distance between the slit die and the base material, that is, a coating gap, is not stabilized, and the shape of the terminal end of the lower surface coated portion deteriorates. A specific example is illustrated in FIG. 12.

FIG. 12 illustrates lower surface coated portions 4 and 4 intermittently coated on a lower surface of base material 3 and lower surface uncoated portion 18 formed between terminal end 40 of lower surface coated portion 4 and starting end 41 of lower surface coated portion 4. Base material 3 is transported in transport direction 9. Even if supply of the coating liquid to the slit die is stopped when base material 3 reaches terminal end 40 of lower surface coated portion 4, since the supply of the coating liquid is gradually stopped while the coating liquid is applied from the slit die to base material 3, the shape of a coating film at terminal end 40 becomes an arc shape and linearity of terminal end 40 of lower surface coated portion 4 deteriorates.

The present disclosure provides a coating method that can form a coating film having good linearity at a terminal end of a lower surface coated portion while a coating liquid is intermittently applied to a base material at a uniform thickness using a slit die. According to the present disclosure, there is provided a coating method of repeatedly forming a lower surface coated portion obtained by forming a coating film on a lower surface of a base material and a lower surface uncoated portion obtained by exposing the lower surface of the base material between a terminal end of the lower surface coated portion and a starting end of the lower surface coated portion, by switching on/off supply of a coating liquid to a slit die facing the lower surface of the base material through a discharge port while the base material is transferred, the method including temporarily expanding a distance between the lower surface of the base material and the discharge port of the slit die during a specific period from termination of the supply of the coating liquid to the slit die to restarting of the supply.

With this configuration, linearity of the terminal end of the lower surface coated portion in which the coating liquid is intermittently formed is improved.

According to the present disclosure, there is provided a coating method of repeatedly forming a lower surface coated portion obtained by forming a coating film on a lower surface of a base material and a lower surface uncoated portion obtained by exposing the lower surface of the base material between a terminal end of the lower surface coated portion and a starting end of the lower surface coated portion, by forming an upper surface coated portion obtained by forming a coating film on an upper surface of the base material by a slit die facing the upper surface of the base material through a discharge port while the base material is transferred, and by switching on/off supply of a coating liquid to the slit die facing the lower surface of the base material through the discharge port while the base material is transferred, the method including temporarily expanding a distance between the lower surface of the base material and the discharge port of the slit die during a specific period from termination of the supply of the coating liquid to the slit die to restarting of the supply.

With this configuration, linearity of the terminal end of the lower surface coated portion in which the coating liquid is intermittently formed is improved.

Further, it is preferable that by ejecting compressed gas onto the lower surface of the base material on an upstream side of the slit die, the distance between the lower surface of the base material and the discharge port of the slit die is temporarily expanded beyond. With this configuration, since the position of the base material can be instantaneously changed, and the amount of displacement of the base material can also be controlled by controlling the pressure of the compressed gas, the present disclosure can be realized by a simple mechanism.

Further, it is preferable that by selectively ejecting compressed gas to a central portion of the base material in a width direction on the lower surface of the base material, the distance between the lower surface of the base material and the discharge port of the slit die is temporarily expanded. With this configuration, the linearity of the terminal end of the lower surface coated portion can be improved. The reason is that immediately before the terminal end of the lower surface coated portion, since a central portion of the base material is recessed vertically downward by the weight of the coating film and the base material, and in this state, the coating film is gradually and intermittently formed with a wide coating gap from an end portion of the base material in the width direction, the linearity of the lower surface coated portion deteriorates. Here, the compressed gas is selectively ejected to the central portion of the base material in the width direction, so that the position of the central portion of the base material can be displaced vertically upward with a small amount of the compressed gas, and the linearity of the terminal end of the lower surface coated portion is improved.

Further, it is preferable that compressed gas is sequentially ejected onto the lower surface of the base material from a central portion of the base material in a width direction toward an outside of the base material in the width direction such that a shape of the base material is parallel to the discharge port of the slit die, and thus the distance between the lower surface of the base material and the discharge port of the slit die is temporarily expanded beyond the distance so far. With this configuration, since the displacement of the base material can be more precisely controlled, the linearity of the terminal end of the lower surface coated portion is further improved.

Further, it is preferable that a period during which the compressed gas is ejected onto the lower surface of the base material is the period from termination of the supply of the coating liquid to the slit die to the restarting of the supply. With this configuration, since the shape of the base material can be already corrected at a timing of starting the intermittent operation, while the linearity of the terminal end of the lower surface coated portion increases, a dimension in the transport direction of the lower surface uncoated portion which is formed between the lower surface coated portion and the lower surface coated portion and to which the surface of the base material is exposed.

Further, it is preferable that when the compressed gas is ejected onto the lower surface of the base material, the distance from the discharge port of the slit die to the surface of the base material is firstly displaced to base material maximum displacement H2 which is larger, is displaced to distance H3 that is in a relationship of H2>H3, and is then displaced to a value that is smaller than distance H3. With this configuration, the shape of the base material can be corrected instantaneously and can be held in a fixed shape, so that the intermittent operation can be performed promptly.

Further, it is preferable that a support member extending from the base material in a width direction comes into contact with the lower surface of the base material on an upstream side of the slit die, and the support member in contact with the lower surface of the base material moves upward and downward, so that the distance between the lower surface of the base material and the discharge port of the slit die is temporarily expanded.

According to the present disclosure, there is provided a coating apparatus including: a slit die of which a discharge port faces a lower surface of a base material; a coating liquid supply controller that switches on/off supply of a coating liquid to the slit die; and a base material height changing device that temporarily expands a distance between the lower surface of the base material and the discharge port of the slit die during a specific period from termination of the supply of the coating liquid to the slit die to restarting of the supply. With this configuration, the linearity of the terminal end of the lower surface coated portion is improved.

Further, it is preferable that the base material height changing device of the coating apparatus according to the present disclosure ejects compressed air onto the lower surface of the base material on an upstream side of the slit die, to temporarily expand a distance between the lower surface of the base material and the discharge port of the slit die.

Further, it is preferable that the base material height changing device of the coating apparatus according to the present disclosure sequentially ejects compressed gas onto the lower surface of the base material from a central portion of the base material in a width direction toward an outside of the base material in the width direction such that a shape of the base material is parallel to the discharge port of the slit die, and thus the base material height changing device temporarily expands a distance between the lower surface of the base material and the discharge port of the slit die beyond a distance so far.

Further, it is preferable that in the base material height changing device of the coating apparatus, a period during which the compressed gas is ejected onto the lower surface of the base material is the period from termination of the supply of the coating liquid to the slit die to the restarting of the supply.

Further, it is preferable that the coating apparatus further includes: a second slit die of which a discharge port faces an upper surface of the base material; and a second coating liquid supply controller that switches on/off supply of the coating liquid to the second slit die.

With this configuration, during a specific period between the termination of the supply of the coating liquid to the slit die and the restarting of the supply, the distance between the lower surface of the base material and the discharge port of the slit die is temporarily expanded, so that the linearity of the terminal end of the lower surface coated portion can be improved, the coating film may have a uniform thickness, and a battery electrode plate having a good shape can be manufactured.

BRIEF DESCRIPTION OF THE DRAWINGS

FIG. 10 is a diagram illustrating a result of Embodiment 1 of the present disclosure;

DESCRIPTION OF EMBODIMENTS

Embodiment 1

Hereinafter, Embodiment 1 of the present disclosure will be described with reference to FIGS. 1 to 9B.

Figure 1:
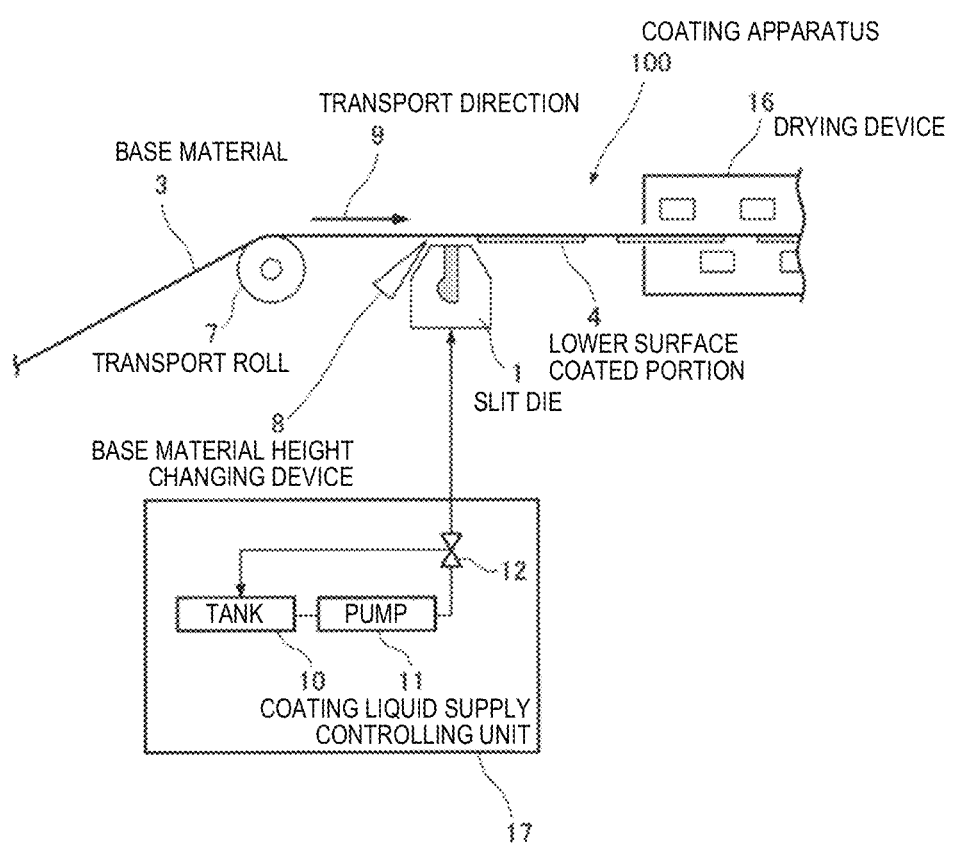
FIG. 1 is a diagram illustrating a configuration of a coating apparatus according to Embodiment 1 of the present disclosure.

FIG. 1 illustrates a coating apparatus 100 for manufacturing a battery electrode plate in which lower surface coated portion 4 is intermittently formed on lower surface of base material 3 in the longitudinal direction of base material 3. Base material 3, transported in a roll-to-roll manner, is supplied from an unwinding machine (not illustrated), is transported in a horizontal direction in transport direction 9 via transport roll 7, forms lower surface coated portion 4 by slit die 1 disposed vertically below base material 3 on a downstream side of transport roll 7, is dried by drying device 16, and then is collected by a winding machine (not illustrated).

Lower surface uncoated portion 18 (FIG. 3D), to which the lower surface of base material 3 is exposed, is formed between lower surface coated portions 4. Tank 10, pump 11, and valve 12 are connected in series to slit die 1, and the coating liquid is supplied to slit die 1 in a fixed amount and is discharged from a discharge port of slit die 1 in a fixed amount, so that lower surface coated portion 4 having a uniform thickness is formed. Tank 10, pump 11, and valve 12 constitute coating liquid supply controller 17 that switches on/off in the supply of the coating liquid to slit die 1.

A coating gap is formed between the lower surface of base material 3 and the discharge port of slit die 1. In general, the coating gap is equal to or more than 0.01 mm and equal to or less than 1.0 mm, which changes depending on properties of a used coating liquid. The coating liquid contains an active material, a binder, a thickener, and a solvent.

Pump 11 needs to quantitatively and continuously supply the coating liquid to slit die 1. Although examples of pump 11 include a screw pump, a diaphragm pump, and the like, the screw pump is often selected as pump 11 in consideration of pulsation.

Although not illustrated in detail, valve 12 includes a reservoir and a valve portion. After the coating liquid supplied from pump 11 enters the reservoir through a flow path, the coating liquid flows toward the valve portion through the flow path. Thereafter, the flow path branches into two parts, and the coating liquid is discharged through the two parts. The flow path branches into a flow path from valve 12 to slit die 1 and a flow path from valve 12 to tank 10. While pump 11 continuously and quantitatively sends the coating liquid, the valve portion of valve 12 is switched to an air cylinder, and the coating liquid heading to slit die 1 side circulates to tank 10 side, so that intermittent coating can be realized.

The coating liquid is always filled in tank 10 under a normal temperature and a normal pressure, and is supplied to pump 11. In particular, when a coating liquid which is easy to settle is used, it is preferable to constantly stir the coating liquid with a not-illustrated mixer or the like.

Base material height changing device 8 that temporarily increases a distance between the lower surface of base material 3 and discharge port of slit die 1 beyond a distance up to that point is provided vertically below base material 3 on an upstream side of slit die 1 in transport direction 9.

Prior to detailed description of base material height changing device 8, a principle in which when lower surface coated portion 4 is formed intermittently, linearity L of terminal end 40 of lower surface coated portion 4 deteriorates will be described with reference to FIGS. 2A to 2D. FIGS. 2A to 2D are side views on the upper side and plan views on the lower side, which illustrate the lower surface of base material 3.

Figure 2A:
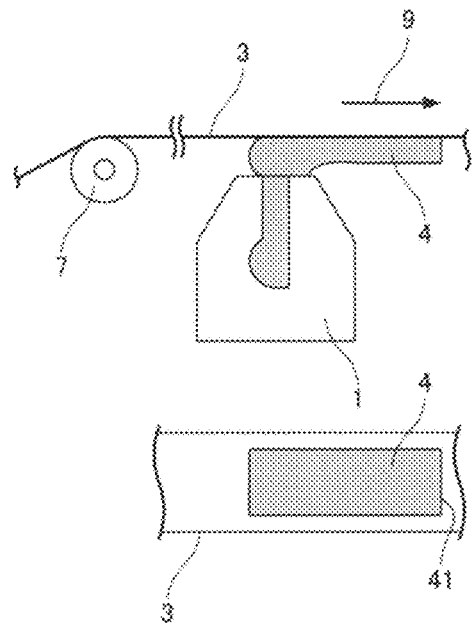
FIG. 2A is a sectional view illustrating lower surface coated portion 4 along a transport direction during a coating process, and a plan view illustrating a lower surface of base material 3.
Figure 2B:
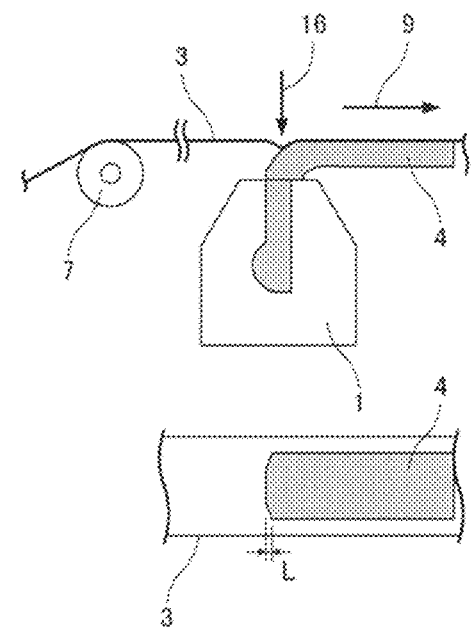
FIG. 2B is a sectional view illustrating, along the transport direction, a state in which when a valve is closed and the coating process is stopped, the base material is drawn into a slit die discharge port and is displaced in a vertical direction, and a plan view illustrating a lower surface of base material 3.

As illustrated in FIG. 2A, when the supply of the coating liquid is stopped from a state in which the coating liquid is supplied to slit die 1 installed vertically below base material 3 and a coating process is performed, as illustrated in FIG. 2B, a force is exerted on base material 3 due to the surface tension of the coating liquid in a direction in which base material 3 is drawn into the discharge port side of slit die 1, so that base material 3 is displaced vertically downward.

Then, since a space between base material 3 and the discharge portion of slit die 1 is narrowed, it is difficult to separate the coating liquid from the discharge port of slit die 1, and liquid shortage failure occurs. This causes deterioration of linearity L of terminal end 40 of lower surface coated portion 4.

Figure 2C:
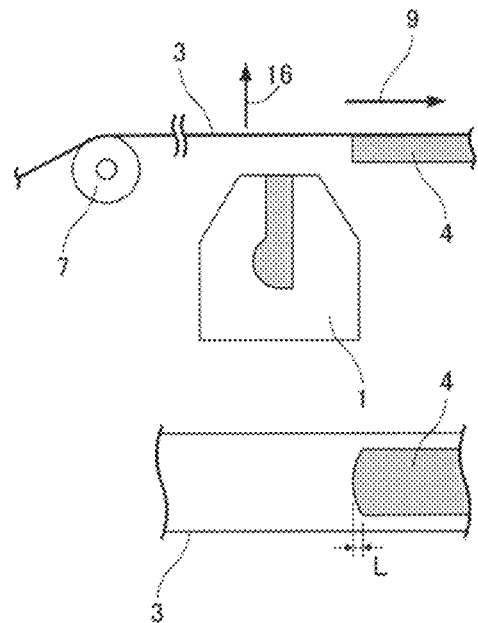
FIG. 2C is a sectional view illustrating, along the transport direction, a state in which the base material 3 is displaced in the vertical direction while a coating liquid is detached from a slit die, and a plan view illustrating the lower surface of base material 3.
Figure 2D:
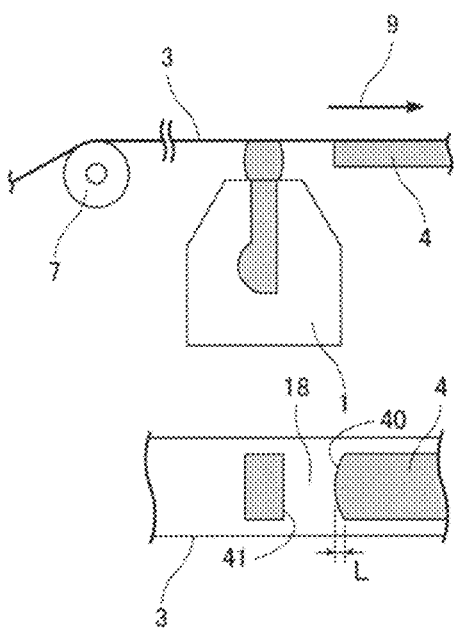
FIG. 2D is a sectional view, along the transport direction, a state in which the coating liquid is applied to base material 3 again, and a plan view illustrating the lower surface of base material 3, in the related art.

As illustrated in FIG. 2C, as a time elapses, the coating liquid completely returns to an inside of slit die 1, so that base material 3 is separated from slit die 1, is displaced vertically upward, and returns to an original position thereof. Thus, as illustrated in FIG. 2D, the supply of the coating liquid restarts, and thus coating of next lower surface coated portion 4 starts.

According to base material height changing device 8 according to Embodiment 1, an occurrence frequency of a phenomenon described in FIG. 2B in which base material 3 is drawn into the discharge port side of slit die 1 and is displaced vertically downward can be reduced. A principle of base material height changing device 8 will be described with reference to FIGS. 3A-3D. FIGS. 3A to 3D are side views on the upper side and plan views on the lower side, which illustrate the lower surface of base material 3.

Figure 3A:
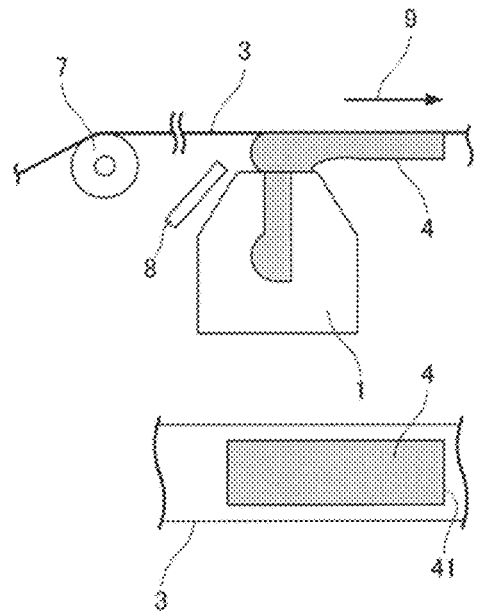
FIG. 3A is a sectional view illustrating lower surface coated portion 4 along a transport direction during a coating process and a plan view illustrating a lower surface of base material 3.
Figure 3B:
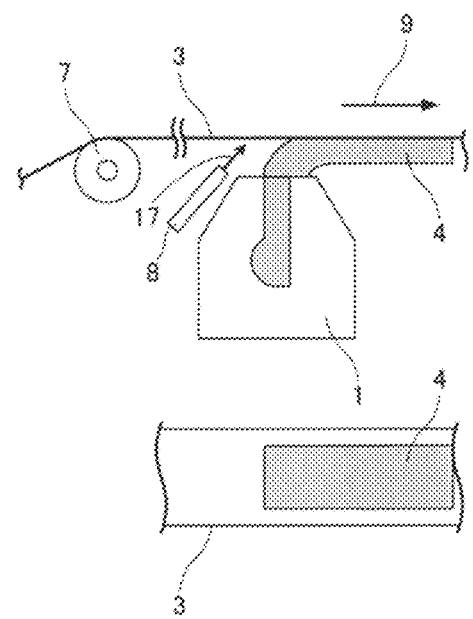
FIG. 3B is a sectional view illustrating, along the transport direction, a state in which when a valve is closed and the coating process is stopped, compressed air is ejected vertically upward from a vertically downward direction of base material 3, so that displacement of the base material is suppressed, and a plan view illustrating a lower surface of base material 3.
Figure 3C:
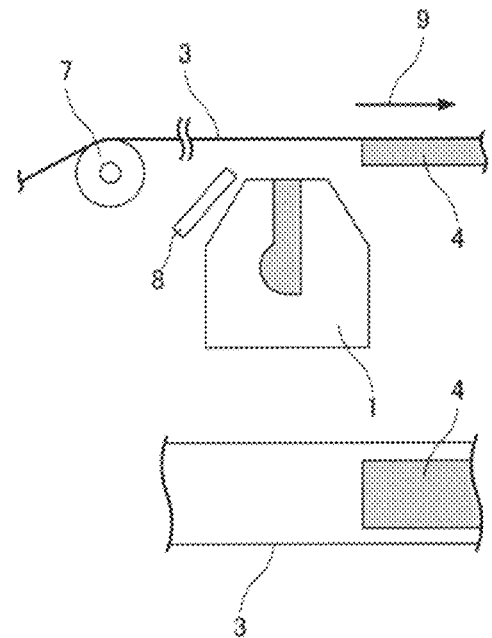
FIG. 3C is a sectional view illustrating, along the transport direction, a state in which base material 3 is stable without being displaced even when a coating liquid is detached from slit die 1, and a plan view illustrating the lower surface of base material 3.
Figure 3D:
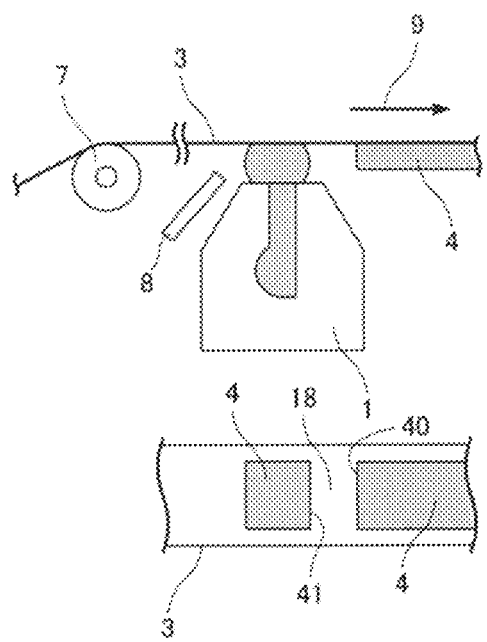
FIG. 3D is a sectional view, along the transport direction, a state in which the coating liquid is applied to base material 3 again, and a plan view illustrating the lower surface of base material 3, in the same embodiment.

As illustrated in FIG. 3A, at the same time or earlier when the supply of the coating from a state in which the coating liquid is supplied to slit die 1 installed vertically below base material 3 and the coating process is performed, as illustrated in FIG. 3B, base material 3 is vertically displaced by base material height changing device 8, and as illustrated in FIG. 3C, the coating liquid and base material 3 forcibly peel from each other. Thereafter, after base material 3 returns to an original state, as illustrated in FIG. 3D, the supply of the coating liquid restarts, and thus coating of next lower surface coated portion 4 starts.

Base material height changing device 8 can be easily realized by ejecting compressed air as compressed gas to the lower surface of base material 3 through a nozzle disposed such that a tip end of the discharge port thereof faces the lower surface of base material 3. Base material height changing device 8 is disposed on an upstream side of slit die 1 and on the lower surface side of base material 3 in the transport direction of base material 3. Base material height changing device 8 has a blowout port that ejects the compressed gas in parallel to the discharge port of slit die 1.

Although the pressure of the ejected compressed air depends on the tensile force and the weight of base material 3 and a coating speed, for example, a pressure that is equal to or more than 0.05 MPa or equal to or less than 0.5 MPa is applied to easily displace base material 3 vertically upward.

That is, a mechanism that can adjust the pressure of normal factory air, such as a regulator, may be applied and may be used while adjusting the pressure. The nozzle is made of resin or metal, and adopts a nozzle that can maintain the shape thereof under the pressure of the compressed air. Although the shape of the nozzle is not limited, for example, the shape may be formed in which cylinders having a diameter of about 1 mm are disposed in a width direction of base material 3 at regular intervals. Further, as the opening/closing of a discharge port of the nozzle can be individually controlled, an ejecting width and an ejecting timing of the compressed air in the width direction of base material 3 are controlled. Thus, the shape of base material 3 can be more precisely controlled, and linearity L of terminal 40 of lower surface coated portion 4 can be further improved.

Figure 4:
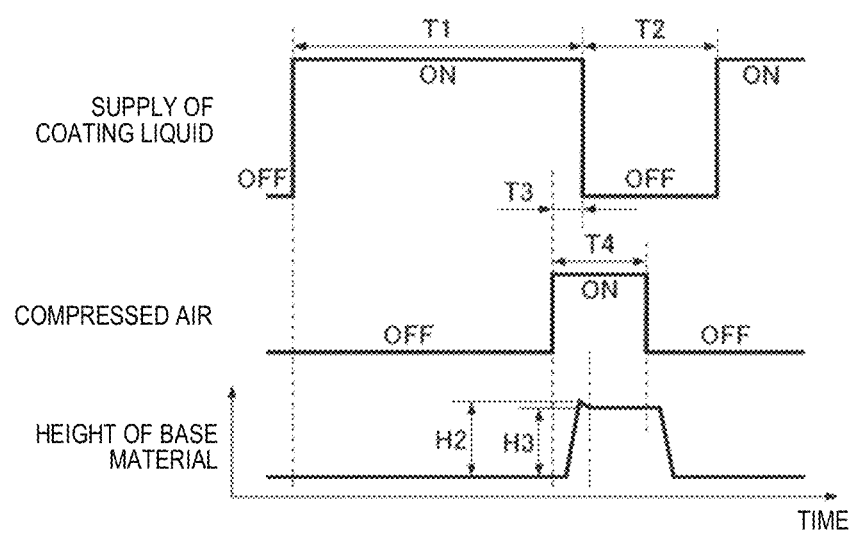
FIG. 4 is a timing diagram illustrating a relationship between an ON/OFF state of supply of the coating liquid, an ON/OFF state of the compressed gas, and the height of base material 3, in the same embodiment.

Time courses of the intermittent coating operation, the compressed air ejecting operation, and the vertical displacement of base material 3 are illustrated in FIG. 4. T1 represents a coating time during which the coating liquid is supplied from tank 10 through pump 11 and valve 12 to slit die 1 and is applied to base material 3. T2 represents a non-coating time during which the coating liquid circulates from tank 10 through pump 11 and valve 12 to tank 10.

In the compressed air ejecting operation, T3 represents a compressed air ejection overlapping time indicating how much a time at which the ejecting of the compressed air to base material 3 starts is quicker than a time at which the coating liquid is supplied to slit die 1. T4 represents a compressed air ejecting time during which the ejection of the compressed air to base material 3 continues.

It is preferable that the vertical displacement of base material 3 when the coating film is intermittently coated continues for a specific time, as illustrated in FIG. 4. H2 indicates a base material maximum displacement of base material 3 during a period from start of ejecting the compressed air to base material 3 to vertically upward displacement of base material 3. Base material maximum displacement H2 is a period during which base material 3 and the coating liquid are connected to each other. In this way, base material 3 is sufficiently displaced so that base material 3 and the coating liquid can peel from each other. H3 represents a base material steady-state displacement of base material 3 when the displacement of base material 3 reaches a steady state from base material maximum displacement H2 after a certain time elapses. Base material steady-state displacement H3 is necessary for maintaining a certain distance between base material 3 and the coating liquid such that base material 3 and the coating liquid do come into contact with each other from a state in which base material 3 and the coating liquid peel from each other.

Figure 5:
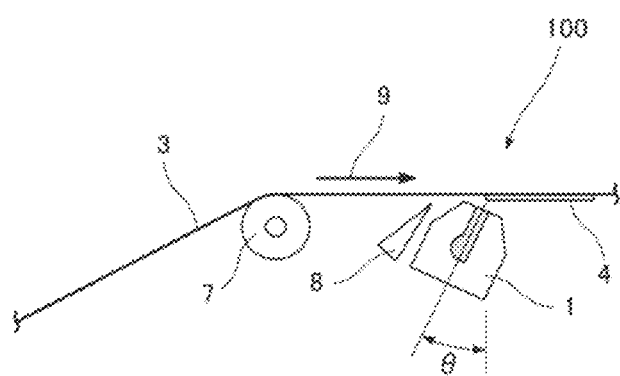
FIG. 5 is a view illustrating an example of an installation angle of slit die 1.

As illustrated in FIG. 5, slit die 1 is not necessarily installed vertically with respect to base material 3, and the discharge port of slit die 1 is oriented in the transport direction of base material 3 by an angle θ that, for example, is equal to or more than 1 degree and is equal to or less than 10 degrees, so that the displacement of base material 3 can be suppressed without directly applying a discharge pressure to base material 3, and shortage of the coating liquid at the terminal end of lower surface coated surface 4 can be resolved.

Next, a specific example where the compressed air is ejected will be described.

Figure 6A:
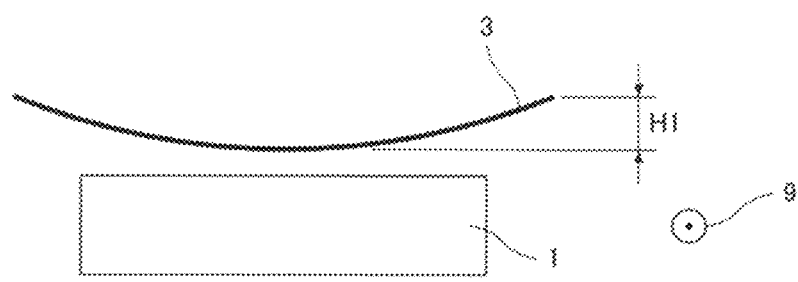
FIG. 6A is a sectional view illustrating, along a width direction of base material 3, a case where linearity of a terminal end of lower surface coated portion 4 is bad.
Figure 6B:
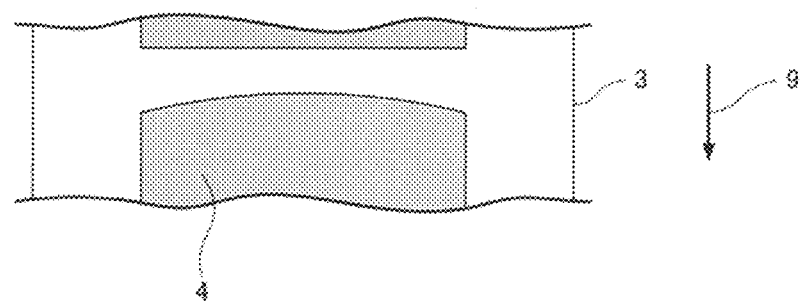
FIG. 6B is a plan view illustrating the lower surface of base material 3.
Figure 7A:
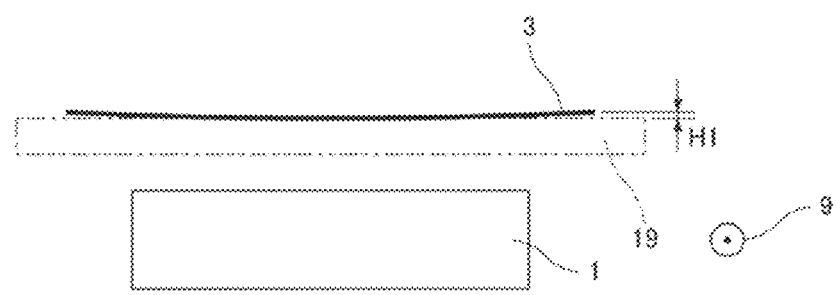
FIG. 7A is a sectional view illustrating, along the width direction of base material 3, a case where linearity of a terminal end of lower surface coated portion 4 is good.
Figure 7B:
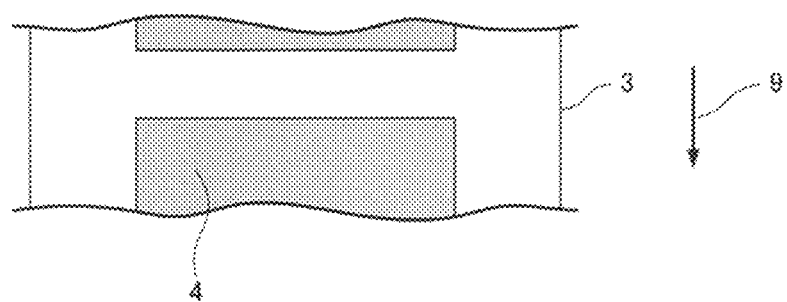
FIG. 7B is a plan view illustrating the lower surface of base material 3.

FIG. 6A is a sectional view illustrating base material 3 when viewed from a lower side of transport direction 9, and FIG. 6B is a plan view illustrating base material 3 and lower surface coated portion 4 at this time. As illustrated in FIG. 6A, in general, the shape of base material 3 in a width direction is bent such that a center thereof is displaced vertically downward by the weight of base material 3. Therefore, a large amount of the compressed air is selectively ejected to a portion of a center of base material 3, in which a base material deflection H1 is large, and thus the shape of base material 3 can be corrected to, using a low flow rate of the compressed air, a state in which base material deflection H1 in a vertical direction is low, as illustrated in FIG. 7A. FIG. 7B is a plan view illustrating a lower surface of base material 3. It is preferable that the compressed air at this time is ejected from a central portion of base material 3 in the width direction such that the shape of base material 3 is always closer to the discharge port of slit die 1 than the nozzle in parallel.

Furthermore, the compressed air is ejected from the central portion of base material 3, and then the nozzle is controlled to eject the compressed air toward an outside of base material 3 in the width direction while the time is gradually delayed, so that the shape of base material 3 can be more precisely controlled.

Further, as another shape, instead of the cylindrical nozzle, for example, two plates may be spaced apart from each other by about 1 mm in the width direction of base material 3 to form a slit.

In the above description, the method of ejecting the compressed air from the nozzle to base material 3 has been described as a specific configuration of base material height changing device 8. However, the following configuration can be cited as another specific example of base material height changing device 8.

In base material height changing device 8, long cylinder 19, which, for example, is parallel to slit die 1 in the width direction and is longer than the width of base material 3 as indicated by a virtual line of FIG. 7A, as a support member extending in the width direction of base material 3, is installed on a bottom surface of base material 3. Cylinder 19 moves upward/downward by a motor so that cylinder 19 comes into contact with the lower surface of base material 3 on an upstream side of slit die 1. Base material 3 is raised by upwardly moving cylinder 19, so that the distance between the lower surface of base material 3 and the discharge port of slit die 1 becomes larger than the distance so far. A timing when cylinder 19 moves upward/downward and a height by which cylinder 19 moves upward/downward are the same as a timing and a height obtained by the compressed air.

Example

In the embodiment illustrated in FIG. 1, a result of the implementation is illustrated in Examples 1 to 7. Further, a conventional example not using the present disclosure is illustrated in Comparative example 1.

In implementing the present example, common conditions will be described below. Slit die 1 is made of stainless steel SUS 430 in which a tip width of an upstream block is 1 mm, a tip width of a downstream block is 1 mm, and a gap between blocks is 0.5 mm. In an installation condition of slit die 1, slit die 1 is tilted by a die angle of 5 degrees, base material 3 and an apex of slit die 1 are in contact with base material 3 to be transported horizontally. A slit made of electrolytic copper foil YB-10 having a width of 60 mm (the thickness: 0.01 mm) manufactured by Nippon Denkai, Ltd. is used in base material 3. A slurry having a viscosity of about 6000 cP measured by a B type viscometer at a rotational speed of 20 revolutions per minute is used as the coating solution. The slurry is sent, at 10 g per minute by a MOHNO PUMP manufactured by HEISHIN Ltd., and is discharged from slit die 1 at a width of 60 mm to form the coating film. A base material transport speed is 1 m/min and a tensile force is 10 N.

Figure 8:
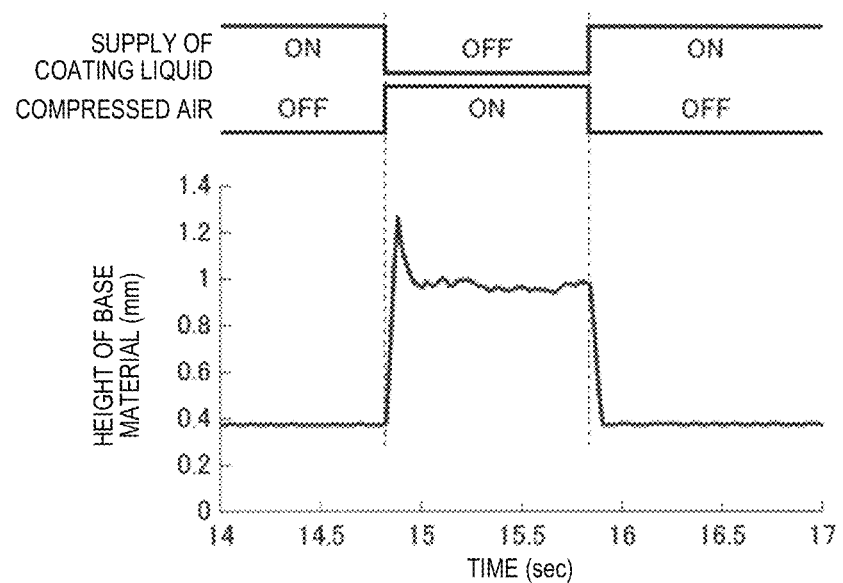
FIG. 8 is a timing diagram illustrating a relationship between an ON/OFF state of supply of the coating liquid, an ON/OFF state of the compressed gas, and the height of base material 3, in Embodiment 1.

In implementing the present example, time courses of the coating operation, the compressed air ejecting operation, and the displacement of base material 3 are illustrated in FIG. 8. As a common condition, coating time T1 is 5 seconds and non-coating time T2 is 1 second.

The nozzle as base material height changing device 8 that ejects the compressed air to base material 3 is installed at an angle of 45 degrees with a space of 1 mm from base material 3 at a position of 5 mm on an upstream side of slit die 1.

In evaluation, two items including displacement and linearity when base material 3 is displaced in a vertical direction are evaluated to determine whether base material 3 is defective or not. Vertical displacement of base material 3 is measured by a laser displacement meter (LK-G30, manufactured by Keyence co., Ltd.), and the linearity of the terminal end of lower surface coated portion 4 is defined as a difference between a maximum value and a minimum value of a coating length obtained by measuring three points (opposite ends and a center) in the width direction. Hereinafter, examples of the present disclosure, which correspond to a small part of the embodiment of the present disclosure, will be described.

Example 1

Figure 9A:
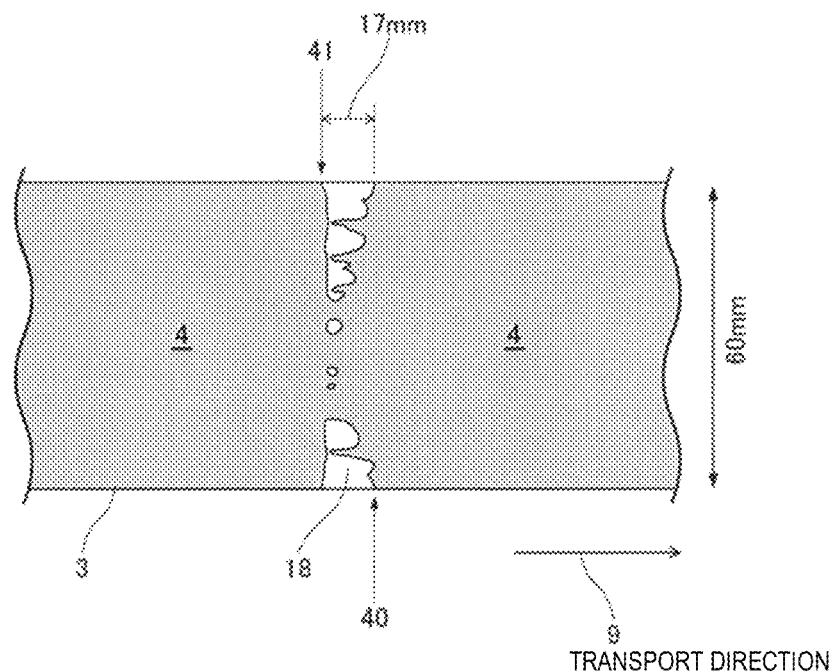
FIG. 9A is a diagram for illustrating a result of poor linearity in a comparative example 1.
Figure 9B:
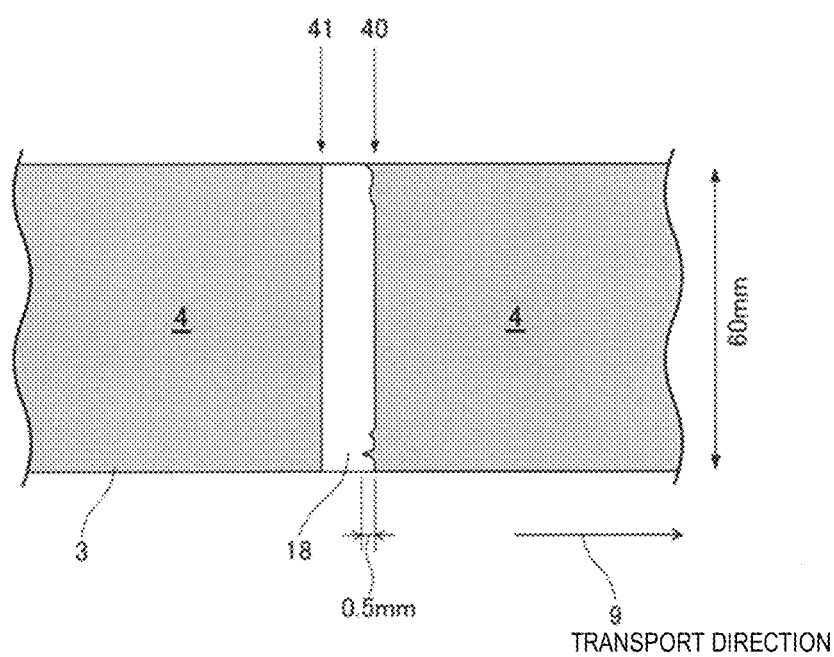
FIG. 9B is a diagram for illustrating a result of good linearity in Embodiment 1.

Example 1 corresponds to a case where the ejection of the compressed air starts simultaneously while the supply of the coating liquid is stopped and the ejection of the compressed air is terminated simultaneously while the supply of the coating liquid restarts. Intermittent coating verification is implemented under a condition in which the pressure of the ejected compressed air is 0.4 MPa, the compressed air ejection overlapping time T3 is 0 second, and ejection time T4 is 1 second. Base material maximum displacement H2 is 0.9 mm, base material steady-state displacement H3 is 0.6 mm, and linearity L of terminal end 40 of lower surface coated portion 4 is 0.5 mm. Displacement of base material 3 when the compressed air is ejected onto base material 3 is illustrated in FIG. 8. As the compressed air is blown, base material 3 is displaced vertically upward by 0.9 mm, and the coating shape of terminal end 40 of lower surface coated portion 4 is illustrated in FIG. 9B. In the case of comparative example 1 described below, it can be understood that linearity L of terminal end 40 of lower surface coated portion 4 is greatly improved as compared to FIG. 9A.

Example 2

Example 2 corresponds to a case where the ejection of the compressed air starts simultaneously while the supply of the coating liquid is stopped and the ejection of the compressed air is terminated simultaneously while the supply of the coating liquid restarts. The intermittent coating verification is implemented under a condition in which the pressure of the ejected compressed air is 0.2 MPa, compressed air ejection overlapping time T3 is 0 second, and ejection time T4 is 1 second. Base material maximum displacement H2 is 0.5 mm, base material steady-state displacement H3 is 0.4 mm, and linearity L of terminal end 40 of lower surface coated portion 4 is 1.0 mm.

An outer appearance of the coating shape of terminal end 40 of lower surface coated portion 4 is finished to be almost the same as that of Example 1.

Example 3

Example 3 corresponds to a case where the ejection of the compressed air starts simultaneously while the supply of the coating liquid is stopped and the ejection of the compressed air is terminated before the supply of the coating liquid restarts. The intermittent coating verification is implemented under a condition in which the pressure of the ejected compressed air is 0.4 MPa, compressed air ejection overlapping time T3 is 0 second, and ejection time T4 is 0.1 second. Base material maximum displacement H2 is 0.9 mm, base material steady-state displacement H3 is 0.6 mm, and linearity L of terminal end 40 of lower surface coated portion 4 is 1.0 mm. An outer appearance of the coating shape of terminal end 40 of lower surface coated portion 4 is finished to be almost the same as that of Example 1.

Therefore, it can be understood that even when a compressed air ejection time is short, linearity L can be improved once base material 3 and the coating liquid are completely separated from each other.

Example 4

Example 4 corresponds to a case where the ejection of the compressed air starts simultaneously while the supply of the coating liquid is stopped and the ejection of the compressed air is terminated simultaneously while the supply of the coating liquid restarts. The intermittent coating verification is implemented under a condition in which the pressure of the ejected compressed air is 0.4 MPa, compressed air ejection overlapping time T3 is 0 second, and ejection time T4 is 1 second. In this example, the compressed air is selectively ejected to an area within 30 mm from the center of base material 3 in the width direction. Base material maximum displacement H2 is 0.9 mm, base material steady-state displacement H3 is 0.6 mm, and linearity L of terminal end 40 of lower surface coated portion 4 is 0.3 mm. An outer appearance of the coating shape of terminal end 40 of lower surface coated portion 4 is finished to be almost the same as that of Example 1.

Example 5

Example 5 corresponds to a case where the ejection of the compressed air starts simultaneously while the supply of the coating liquid is stopped and the ejection of the compressed air is terminated simultaneously while the supply of the coating liquid restarts. The intermittent coating verification is implemented under a condition in which the pressure of the ejected compressed air is 0.4 MPa, compressed air ejection overlapping time T3 is 0 second, and ejection time T4 is 1 second. In this example, as a nozzle hole is controlled to be opened, the compressed air is ejected from a center toward opposite ends by a distance of 60 mm in the width direction of base material 3 for 0.5 seconds in total. Base material maximum displacement H2 is 0.9 mm, base material steady-state displacement H3 is 0.6 mm, and linearity L of terminal end 40 of lower surface coated portion 4 is 0.1 mm. An outer appearance of the coating shape of terminal end 40 of lower surface coated portion 4 is finished to be almost the same as that of Example 1.

Example 6

Example 6 corresponds to a case where the ejection of the compressed air starts before the supply of the coating liquid is stopped and the ejection of the compressed air is terminated before the supply of the coating liquid restarts. The intermittent coating verification is implemented under the condition in which the pressure of the ejected compressed air is 0.4 MPa, compressed air ejection overlapping time T3 is 0.1 second, and ejection time T4 is 1 second. Base material maximum displacement H2 is 0.9 mm, base material steady-state displacement H3 is 0.6 mm, and linearity L of terminal end 40 of lower surface coated portion 4 is 0.1 mm. An outer appearance of the coating shape of terminal end 40 of lower surface coated portion 4 is finished to be almost the same as that of Example 1.

Example 7

Example 7 corresponds to a case where the ejection of the compressed air starts before the supply of the coating liquid is stopped and the ejection of the compressed air is terminated simultaneously while the supply of the coating liquid restarts. The intermittent coating verification is implemented under the condition in which the pressure of the ejected compressed air is 0.4 MPa, compressed air ejection overlapping time T3 is 0.1 second, and ejection time T4 is 1.1 second. Base material maximum displacement H2 is 0.9 mm, base material steady-state displacement H3 is 0.6 mm, and linearity L of terminal end 40 of lower surface coated portion 4 is 0.1 mm. An outer appearance of the coating shape of terminal end 40 of lower surface coated portion 4 is finished to be almost the same as that of Example 1.

Example 8

The intermittent coating verification is implemented under a condition in which a mechanism that can move upward/downward by a servomotor is attached to one side of a cylinder having a diameter of 8 mm and made of stainless steel SUS303. A rising speed is 10 mm/sec, a holding time is 1 second, and the lowering speed is 8 mm/sec. Base material maximum displacement H2 is 1.0 mm, base material steady-state displacement H3 is 0.8 mm, and linearity L of terminal end 40 of lower surface coated portion 4 is 1.5 mm. An outer appearance of the coating shape of terminal end 40 of lower surface coated portion 4 is finished to be almost the same as that of Example 1. Examples 1 to 8 are summarized in FIG. 10. Examples 1 to 8 are compared with the following comparative example 1.

Comparative Example 1

Intermittent coating is implemented by a method according to the related art without using a mechanism that displaces base material 3. Linearity L of terminal end 40 of lower surface coated portion 4 is 17 mm, which is very poor linearity. The coating shape of terminal end 40 of lower surface coated portion 4 is illustrated in FIG. 9A.

Embodiment 2

Next, embodiment 2 of the present disclosure will be described.

Figure 11:
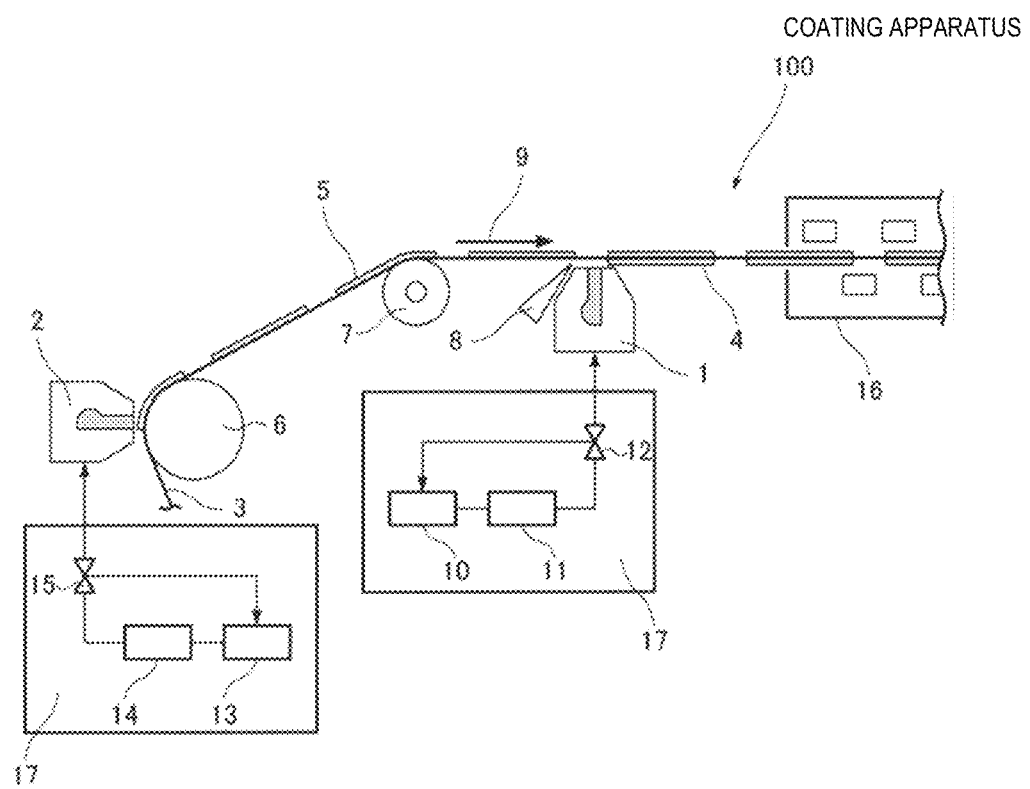
FIG. 11 is a diagram illustrating a configuration of a coating apparatus according to Embodiment 2.
Figure 12:
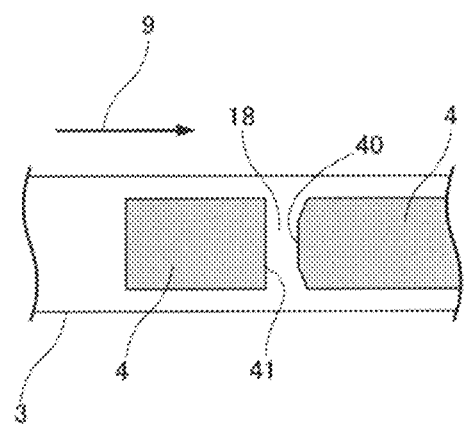
FIG. 12 is a plan view illustrating the shape of a terminal end of lower surface coated portion 4 according to the related art.

FIG. 11 illustrates a coating apparatus 100 for manufacturing a battery electrode plate in which an upper surface coated portion 5 is intermittently formed on an upper surface of base material 3 in the longitudinal direction of base material 3 by slit die 2 while lower surface coated portion 4 is intermittently formed on the lower surface of base material 3 in the longitudinal direction of base material 3 by slit die 1.

In coating apparatus 100, base material 3 supplied from an unwinding machine (not illustrated) is transmitted in an order of backup roll 6 and transport roll 7 and is transported in a horizontal direction after transport roll 7. Slit die 2 is installed with a space to face backup roll 6, and upper surface coated portion 5 is formed on the upper surface of base material 3 by slit die 2. Thereafter, in a state in which upper surface coated portion 5 faces the vertically upper side, base material 3 is transported in transport direction 9 by backup roll 6 and transport roll 7. Slit die 1 is installed with a space on the downstream side of transport roll 7 in transport direction 9 vertically downward with respect to base material 3, and upper surface coated portion 5 is formed before lower surface coated portion 4 is formed on the lower surface of base material 3 by slit die 1. Thereafter, base material 3 on which lower surface coated portion 4 and upper surface coated portion 5 are formed is transported to drying furnace 16 without physically touching the respective coating films, forms a dried film, and is recovered by a winder (not illustrated).

Tank 10, pump 11, and valve 12 are connected in series to slit die 1 in an order of tank 10, pump 11, and valve 12, and the coating liquid is supplied to slit die 1 in a fixed amount and is discharged from a discharge port of slit die 1 in a fixed amount, so that lower surface coated portion 4 having a uniform thickness is formed. Further, tank 13, pump 14, and valve 15 are connected in series to slit die 2 in an order of tank 13, pump 14, and valve 15, and the coating liquid is supplied to slit die 2 in a fixed amount and is discharged from a discharge port of slit die 2 in a fixed amount, so that upper surface coated portion 5 having a uniform thickness is formed. It is preferable that pump 11 and pump 14 are different from each other, valve 12 and valve 15 are also different from each other, and tank 10 and tank 13 are the same.

Valve 12 branches into a pipe leading to slit die 1 and a pipe leading to tank 10. While pump 11 continuously and quantitatively sends the coating liquid, valve 12 is switched to cause the coating liquid leading to slit die 1 side to circulate to tank 10 side, so that lower surface coated portion 4 can be formed intermittently. Further, valve 15 branches into a pipe leading to slit die 2 and a pipe leading to tank 13. While pump 14 continuously and quantitatively sends the coating liquid, valve 15 is switched to cause the coating liquid leading to slit die 2 side to circulate to tank 13 side, so that upper surface coated portion 5 can be formed intermittently.

Base material height changing device 8 installed vertically below base material 3 on an upstream side of slit die 1 in transport direction 9 can be realized in the same manner as base material height changing device 8 according to the first embodiment. Thus, although not described in detail, in slit die 2 forming upper surface coated portion 5, base material 3 is installed in backup roll 6 such that a position thereof is not changed by a sufficient tensile force. Thus, it is easy to estimate that there is no need to install base material height changing device 8 on an upstream side of slit die 2 in transport direction 9.

As discussed in the above embodiments, tank 10, pump 11, and valve 12 can constitute coating liquid supply controller 17 that switches on/off in the supply of the coating liquid to slit die 1. A controller configured according to instructions in an associated memory can be programmed to generate control signals to switch on/off the valve 12. The controller can also be configured to send control signals to the base material height changing device 8 to adjust the distance between the lower surface of the base material and the discharge port of the slit die 1. The controller can be an integrated circuit such as a microcontroller or microprocessor.

The present disclosure contributes to a high capacity of a lithium ion secondary battery electrode plate and the like, since a coating film can be formed intermittently and favorably on a base material.

What is claimed is:

1. A coating apparatus comprising:
    a transport roll configured to contact a lower surface of a base material and transport the base material;
    a slit die having a discharge port which faces the lower surface of the base material, the slit die being on a downstream side of the transport roll in a transport direction of the base material;
    a coating liquid supply controller configured to switch on and/or off in supply of a coating liquid to the slit die; and
    a cylindrical nozzle configured to eject compressed gas onto the lower surface of the base material during a specific period from a termination of the supply of the coating liquid to the slit die to a restart of the supply of the coating liquid to the slit die,
    wherein the cylindrical nozzle is configured to eject the compressed gas onto the lower surface of the base material only at an acute angle with respect to a portion of the lower surface of the base material between the cylindrical nozzle and the transport roll.

2. The coating apparatus of claim 1,
    wherein the cylindrical nozzle is configured to eject the compressed gas onto the lower surface of the base material on an upstream side of the slit die, so as to temporarily expand a distance between the lower surface of the base material and the discharge port of the slit die.

3. The coating apparatus of claim 1,
    wherein the cylindrical nozzle is configured to sequentially eject the compressed gas onto the lower surface of the base material from a central portion of the base material in a width direction toward an outside of the base material in the width direction.

4. The coating apparatus of claim 2,
    wherein the compressed gas is ejected onto the lower surface of the base material from the termination of the supply of the coating liquid to the slit die to the restart of the supply of the coating liquid to the slit die.

5. The coating apparatus of claim 1, wherein:
    the slit die is a first slit die and the coating liquid supply controller is a first coating liquid supply controller; and
    the coating apparatus further comprises:
    a second slit die having a discharge port which faces an upper surface of the base material; and a second coating liquid supply controller configured to switch on and/or off in supply of the coating liquid to the second slit die.

6. The coating apparatus of claim 1, wherein the cylindrical nozzle is on an upstream side of the slit die and faces the lower surface of the base material in the transport direction of the base material.

7. The coating apparatus of claim 1, wherein the cylindrical nozzle is configured to temporarily expand a distance between the lower surface of the base material and the discharge port of the slit die.

8. The coating apparatus of claim 1, wherein an entirety of the cylindrical nozzle is inclined at the acute angle with respect to the portion of the lower surface of the base material between the cylindrical nozzle and the transport roll.

* * * * *